United States Patent [19]

Ohkubo

[11] 4,167,661
[45] Sep. 11, 1979

[54] MICROWAVE OVEN

[75] Inventor: Masaru Ohkubo, Yamatokoriyama, Japan

[73] Assignee: Matsushita Electric Industrial Co., Ltd., Kadoma, Japan

[21] Appl. No.: 769,302

[22] Filed: Feb. 16, 1977

[30] Foreign Application Priority Data

Feb. 20, 1976 [JP] Japan .................................. 51/18121

[51] Int. Cl.² ............................................. H05B 9/06
[52] U.S. Cl. ............................ 219/10.55 F; 310/103; 310/237
[58] Field of Search ................. 219/10.55 F; 310/268, 310/237, 103, 257; 274/1 E, 1 F, 39 A; 259/DIG. 46

[56] References Cited

U.S. PATENT DOCUMENTS

| 1,136,739 | 4/1915 | Tiffany | 274/1 E |
| 1,338,568 | 4/1920 | Foote | 310/257 |
| 1,524,370 | 1/1925 | Seibt et al. | 274/1 E |
| 2,520,602 | 8/1950 | Linder | 219/10.55 F |
| 2,847,589 | 8/1958 | Haydon | 310/237 |
| 3,090,880 | 5/1963 | Raymond | 310/237 |
| 3,113,228 | 12/1963 | Tolegian | 259/DIG. 46 |
| 3,375,383 | 3/1968 | Philbrick | 310/103 |
| 3,377,562 | 4/1968 | Staats | 219/10.55 F |
| 3,523,204 | 8/1970 | Rand | 310/103 |
| 3,621,313 | 11/1971 | Walton | 310/257 |
| 3,683,248 | 8/1972 | Kobayashi et al. | 274/39 A |
| 3,988,024 | 10/1976 | Watanabe | 274/39 A |
| 4,059,780 | 11/1977 | Mazuir | 310/257 |
| 4,092,512 | 5/1978 | Suzuki et al. | 219/10.55 F |

FOREIGN PATENT DOCUMENTS

| 1907822 | 2/1969 | Fed. Rep. of Germany | 274/1 E |
| 578223 | 10/1975 | Fed. Rep. of Germany | 274/1 E |
| 966966 | 8/1964 | United Kingdom | 310/268 |

OTHER PUBLICATIONS

Indiana General Engineering Data Form 382, 3/1970.

Primary Examiner—Gerald P. Tolin
Assistant Examiner—Bernard Roskoski
Attorney, Agent, or Firm—Cushman, Darby & Cushman

[57] ABSTRACT

A microwave oven, provided with a turning tray disposed in a cooking chamber in an oven case for uniform heating of the cooked object, wherein
  the turning tray comprises N and S poles of permanent magnet circularly disposed around the axis of and underneath the turning tray, and
  the oven case comprises an electromagnet with a circular arrangement of poles of opposite polarities alternately disposed for generating a magnetic field to interact with the poles of the permanent magnet and to revolve them around the axis, whereby
  the cooking chamber has no mechanical element, such as shaft, hole or the like, for pivoting the tray to turn.

3 Claims, 8 Drawing Figures (A)

(B)

(C)

(D)

(E)

MICROWAVE OVEN

BACKGROUND OF THE INVENTION

In conventional microwave ovens with a turning tray disposed in a cooking chamber of an oven case for uniform heating, ordinary electric motors, for instance, induction motors with reduction gear means, have been used for turning the tray. In such conventional ovens, the mechanism is complicated and expensive because of the use of a motor and the reduction gear means. Moreover, because a shaft for revolving the turning tray is disposed to penetrate the bottom of the cooking chamber, the floor plate has a shaft hole which permits boiled-over over juice to pass into the reduction gear means and the motor. Therefore, the conventional microwave oven is liable to have troubles resulting from rust on the mechanical parts and deterioration of insulation caused by the boiled over juice.

In order to overcome this shortcoming of the above-mentioned conventional microwave oven, there has been proposed a device comprising a first set of permanent magnets fixed under the turning tray and a second set of several permanent magnets fixed to a turning means situated underneath the floor plate of the cooking chamber in a manner such that the second set of the permanent magnets and the first set of the permanent magnets are magnetically coupled so as to interact with each other to drive the turning tray when the turning means revolves. Such improved apparatus still has the shortcoming of large bulk because of the use of a motor and a reduction gear means.

SUMMARY OF THE INVENTION

The present invention provides a microwave oven provided with a turning tray in a cooking chamber, characterized by the dispensing of pivoting means, such as shaft, and the concomittent protrusion from a hole in the floor of the cooking chamber, in order to improve the durability of the mechanism and facilitate easy cleaning of the cooking chamber floor.

The present invention also reduces the space occupied by the mechanism for turning the tray by dispensing with conventional reduction gear means.

BRIEF DESCRIPTION OF A DRAWING

FIG. 1 is a perspective view according to the microwave oven the present invention, FIG. 2 is a partially fragmented perspective view of the essential part of the microwave oven of the present invention, FIG. 3 is an enlarged partially fragmented perspective view of a further essential part of the oven of FIG. 2, FIGS. 4 (A) to (D) are schematic views illustrating motion of the poles of a permanent magnet forming part of the present invention, and FIG. 4 (E) is a plot of current applied to an electromagnet forming another part of the present invention.

DETAILED DESCRIPTION OF THE INVENTION

Figure 1:
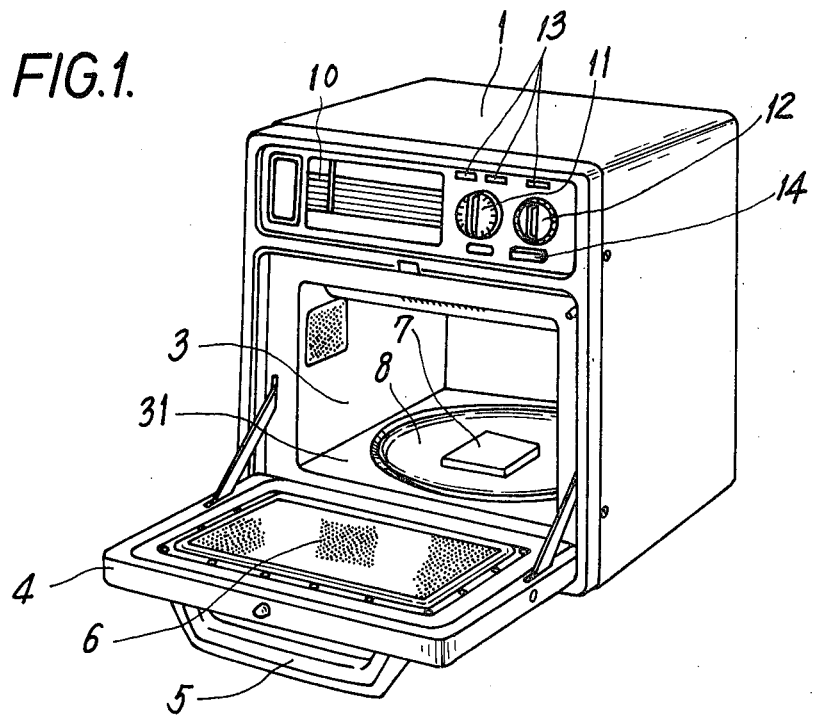
Figure 2:
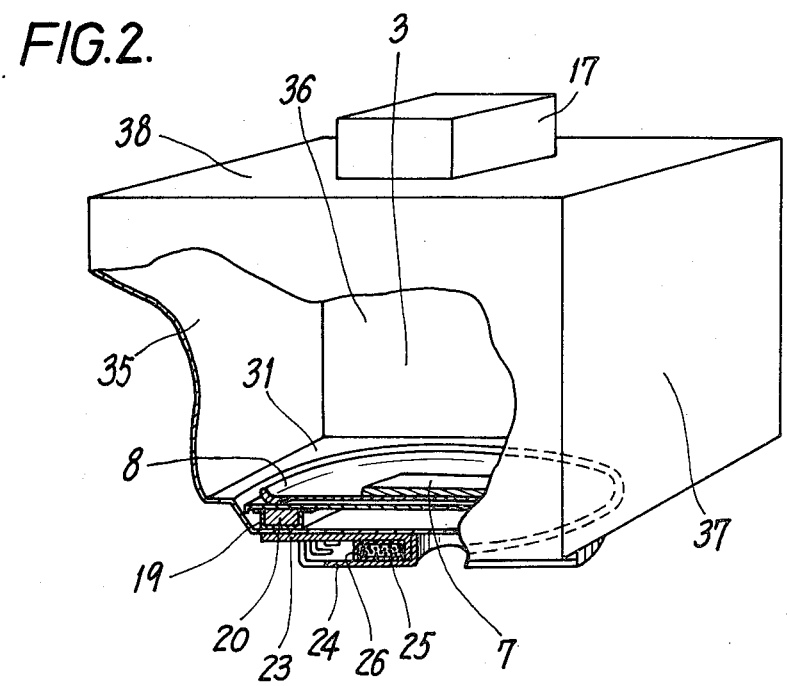

FIGS. 1 and 2 show a microwave oven embodying the present invention. The microwave oven comprises a case 1 in which a cooking chamber 3 is defined by three walls 35, 36 & 37, ceiling 38 and a floor 31 all of which are made of metal plate, for instance, stainless steel. A door 4 of this cooking chamber 3 is made of a metal to shield electromagnetic waves and has a see-through metal net part 6 at the center as well as a door handle.

The floor 31 is substantially flat without any protrusion, hole or shaft, and it is made of a magnetically insensitive metal plate, for instance, the so-called 18-8 stainless steel (containing 8% nickel, 18% chrome and the balance iron). A dial 10 is provided for indicating the cooking time set by knobs 11 or 12, for strong or weak heating, respectively. Indication lamps 13 are employed for indicating the state of operation of the microwave oven. A start switch button 14 is provided for switching on a microwave oscillator 17.

A turning tray 8 for holding an object 7 to be cooked is placed on the floor 31.

The essential parts of the microwave oven are shown in greater detail in the partially fragmented view of FIG. 2, wherein the microwave oscillator 17, for instance, a magnetron oscillator, is disposed on the ceiling 38 of the cooking chamber 3.

Figure 3:
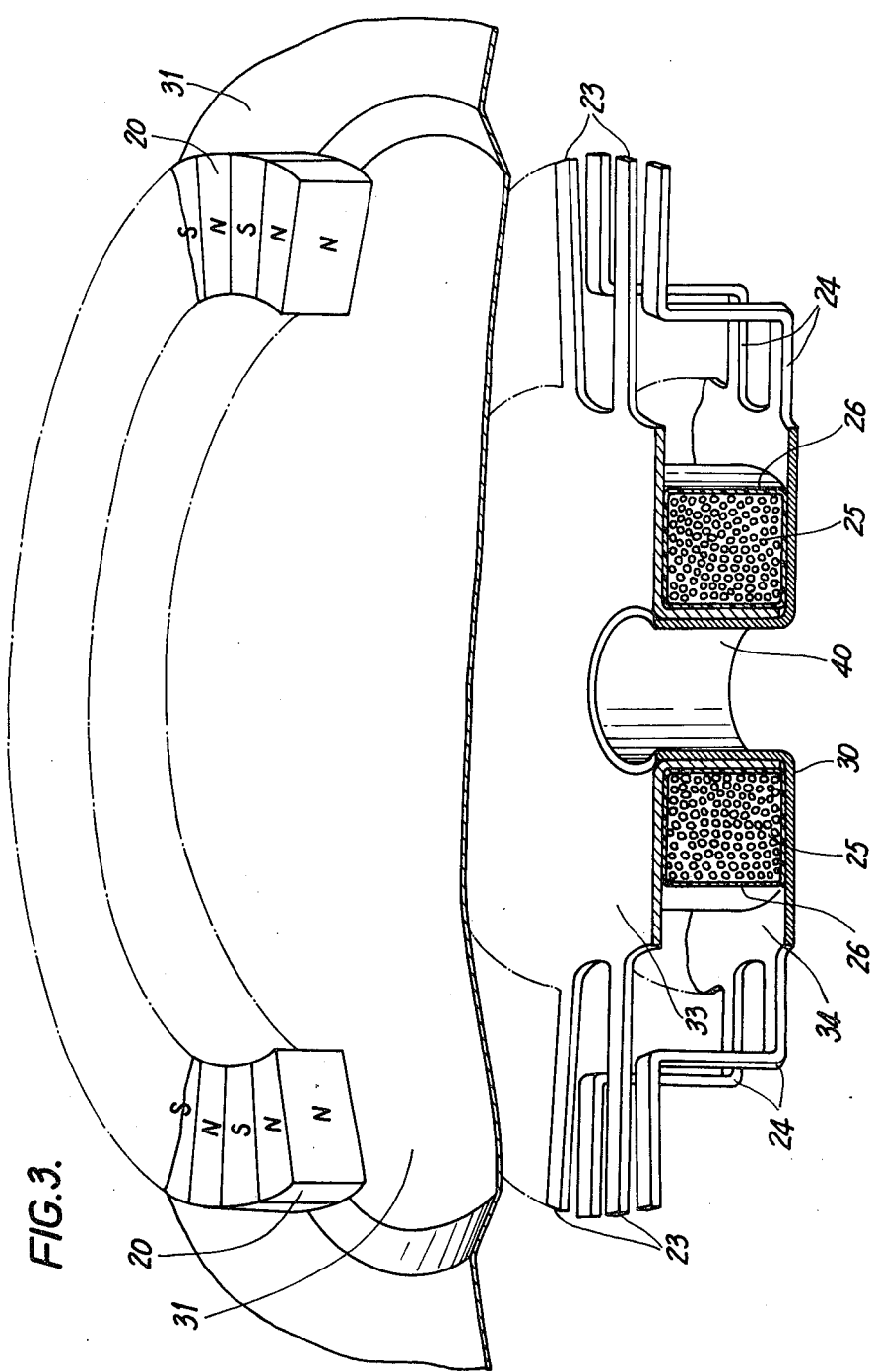

The turning tray 8 has a permanent magnet 20 fixed thereunder in such a manner that the N and S poles thereof are alternately disposed within a frame 19, in circular fashion as shown in FIG. 3, the circle lying in a plane perpendicular to the turning axis and having its center located along the turning axis of the tray 8. For use as a permanent magnet 20, a ring shaped ferrite permanent magnet or a ring shaped cast alloy magnet magnetised in a manner to have different poles alternately along the ring, as shown in FIG. 3 is suitable. A row of small magnets disposed in a circular ring in a manner such that N and S poles thereof are alternately arranged can also be used for the permanent magnet 20. For light, easy and smooth turning of the tray 8, it is preferable to provide the bottom of the tray 8 with three of more wheels or rollers.

Under the floor 31 of the cooking chamber 3, an electromagnet 30 is fixed. The electromagnet 30 comprises an upper yoke 33 and a lower yoke 34. Both the upper yoke 33 and the lower yoke 34 have radially extending poles 23 and 24, respectively. The poles 23 and 24 which become poles of opposite polarities when the electromagnet is excited, are disposed alternately in a circle within a plane parallel to and underneath the floor 31 and at a position immediately beneath said ring shaped permanent magnet 20. The angular pitch of the alterations of the polarity poles 23 and 24 is selected to be the same as that of the N and S poles of the permanent magnet 20. A coil 25 is wrapped by an insulation film 26 and is disposed between the upper and the lower yokes 33 and 34 and around a center core 40 which is formed by bending the center parts of the upper and the lower yokes 33 and 34. The poles of the permanent magnet and those of the electromagnet constitute a slow speed motor.

Operation of the microwave oven of the present invention is as follows:

By impressing an AC current of a frequency of, for instance, 60 Hz to the coil 25, the upper and the lower yokes 33 and 34, and hence, the poles 23 and 24 respectively, are alternately magnetized to be N and S and vice versa, the N and S alternating at a frequency of 60 times per second. The first set of poles 23 and the second set of poles 24 are always magnetized in the opposite polarities.

Referring to FIG. 4(E), if the current I in the coil 25 is positive during the period between t0 and t2, and the polarities of the poles 23 and 24 in relation with the permanent magnet 20 and the positions of the poles of the permanent magnet 20 are as shown in FIG. 4(A), then the permanent magnet 20 is actuated by a turning force shown by arrow F of FIG. 4(A). Accordingly, the permanent magnet 20, and the tray 8 affixed thereto, in the direction of the arrow F.

At the time t2 when the current I is zero, the poles 23 and 24 become neutral as shown in FIG. 4(B), but because of the inertia of the tray 8 and the permanent magnet 20, the tray 8 and the magnet 20 continue to turn in the direction of arrow I of FIG. 4(B).

During the period between t2 and t4 when the current I in coil 25 is negative and the polarities and positions of the ples 23 and 24 in relation with the poles of the permanent magnet 20 are as shown in FIG. 4(C), magnet 20 is actuated by a turning force as shown by arrow F of FIG. 4(C). Accordingly, the magnet 20 and tray 8 turn in the direction of the arrow F.

When at the time t4 the current I again is zero, the poles 23 and 24 become neutral and as described with respect to FIG. 4(B), by means of the inertia of the tray 8 and the permanent magnet 20, they continue to turn in the direction of the arrow I.

Figure 4:
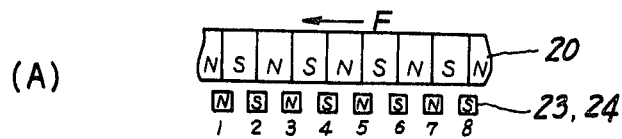
Figure 4:
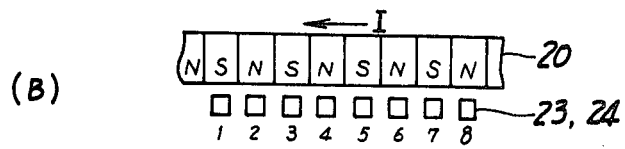
Figure 4:
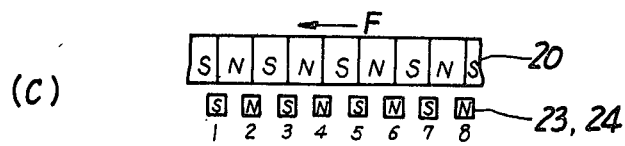
Figure 4:
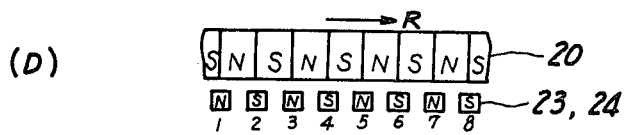
Figure 4:
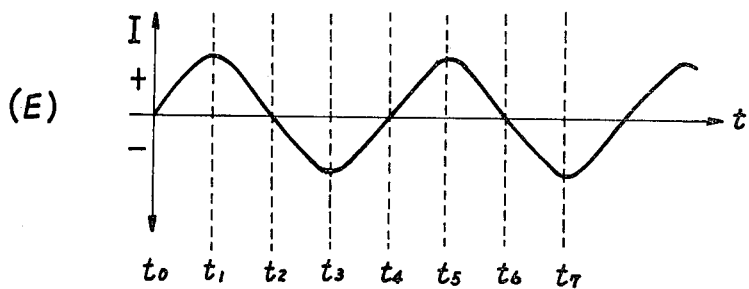

If the polarities and positions of the poles 23 and 24 in relation with the poles of the permanent magnet 20 are as shown in FIG. 4(D) during the period between t0 and t2, then the permanent magnet 20 receives a turning force as shown by an arrow R of FIG. 4(D). Accordingly, the permanent magnet 20 and tray 8 turn in the direction of the arrow R which is opposite to the turning direction described when referring to FIGS. 4, (A) to (C). In this case, the tray continues to turn in the direction of the arrow R. Thus, the tray turns in either direction dependent upon to the initial relationship between the poles of the permanent magnet 20 and the poles of the electromagnet 30.

In the event that the poles of the permanent magnet 20 and the poles of the electromagnet 30 are in the position as shown in FIG. 4(B), namely when the poles of the permanent magnet 20 are right above the poles it is necessary to activate the permanent magnet 20 in either direction to start the revolution. Such initial activation can be made by known means such as an electromagnetic plunger, or a mechanical activator linked to the starting switch 14. The provision of conventional shading coils in at least a part of the poles 23 and 24 of electromagnet 30 also is recommended for easy starting of the turning operation.

The interaction between the poles of the permanent magnet 20 and the poles 23 and 24 of the electromagnet 30, achieves smooth turning power for the tray even when some of either the poles of the permanent magnet 20 or the poles 23 and 24 are omitted. Thus, either the poles of the permanent magnet 20 or the poles 23 and 24 of the electromagnet 30 can be partially disposed of along the circle.

The tray turning means of the microwave oven of the present invention has the advantages:

that the floor 31 of the cooking chamber 3 can be made substantially flat by dispensing with a driving shaft, protrusion and hole for pivoting the turning tray 8;

that the turning means can be made compact, since it employs a multiple-pole AC motor rather than bulky reduction gear means and an ordinary motor;

that the electromagnet 30 of the turning means can be made flat, since the coil 25 of the electromagnet 30 is sandwiched between the upper and lower yokes 33 and 34 of the first set of poles 23 and the second set of poles 24, respectively; and that the coil 25 can be made compact, and hence the amount of copper wire used in the coil 25 can be made small, since the coil 25 is disposed in the center part of the electromagnet 30 while the poles 23 and 24 are disposed in the peripheral part.

What is claimed is:

1. A microwave oven having an oven case, a microwave oscillator to feed a microwave electromagnetic field into a cooking chamber in said oven case, and a turning tray rotatably disposed on, and supported by, a bottom plate in said cooking chamber, characterized in that:

said turning tray comprises a plurality of N and S poles of permanent magnet alternately disposed in a first circle around the axis of rotation of the turning tray;

said oven case houses a plurality of poles of a stationary electromagnet disposed in a second circle and positioned on the opposite side of said bottom plate from the tray, said second circle having substantially the same diameter as the first circle and also being disposed about the axis of rotation of the turning tray, said poles of the electromagnet having substantially the same angular pitch as the angle between adjacent permanent magnets, adjacent electromagnet poles generating alternating magnetic fields of opposite polarity independently of the position of the poles of the permanent magnet, the magnetic fields interacting with magnetic fields of said poles of the permanent magnet to revolve them and said tray around the axis; and said bottom plate of said cooking chamber is substantially flat and solid thereby isolating the electromagnet in a watertight manner from the interior of the cooking chamber.

2. A microwave oven of claim 1 further characterized in that said electromagnet comprises a set of poles of a first kind and a set of poles of a second kind, and that said poles of the first kind and said poles of the second kind are alternately disposed in said second circle which is in a plane parallel with and near the floor of said cooking chamber.

3. A microwave oven of claim 2 further characterized in that said poles of the electromagnet are disposed around a coil of said electromagnet.

* * * * *